(12) United States Patent
Vlaar et al.

(10) Patent No.: US 8,355,835 B2
(45) Date of Patent: Jan. 15, 2013

(54) SYSTEM FOR DEMARCATING AN AREA (75) Inventors: Iwan Yves Vlaar, Zegge (NL); Karel Van Den Berg, Bleskensgraaf (NL); Jan Martinus Van Kuilenburg, Wadenoyen (NL)

(73) Assignee: Maasland N.V., Maassluis (NL)

( * ) Notice: Subject to any disclaimer, the term of this patent is extended or adjusted under 35 U.S.C. 154(b) by 949 days.

(21) Appl. No.: 12/444,411

(22) PCT Filed: Sep. 19, 2007

(86) PCT No.: PCT/NL2007/000234
§ 371 (c)(1),
(2), (4) Date: Apr. 6, 2009

(87) PCT Pub. No.: WO2008/044915
PCT Pub. Date: Apr. 17, 2008

(65) Prior Publication Data
US 2010/0049392 A1 Feb. 25, 2010

Related U.S. Application Data (63) Continuation of application No. PCT/NL2007/000234, filed on Sep. 19, 2007.

(30) Foreign Application Priority Data

Oct. 11, 2006 (NL) ...................................... 1032662

(51) Int. Cl.
*G05D 3/12* (2006.01)

(52) U.S. Cl. .................... 701/28; 701/1; 701/2; 701/23; 701/50; 701/400; 701/408; 701/514; 119/416; 318/587; 242/550; 242/554; 242/557; 242/563; 242/564; 345/418

(58) Field of Classification Search .................. None
See application file for complete search history.

(56) References Cited

U.S. PATENT DOCUMENTS

| 4,341,181 | A | * | 7/1982 | Fair ............................... 119/512 |
| 5,572,954 | A | * | 11/1996 | Elkins ........................... 119/502 |
| 6,062,165 | A | * | 5/2000 | Sieling ........................ 119/14.03 |
| 6,302,156 | B1 | * | 10/2001 | Lardet et al. .................... 140/16 |
| 6,439,162 | B1 | * | 8/2002 | van den Berg ................ 119/174 |
| 6,611,738 | B2 | * | 8/2003 | Ruffner ........................... 701/23 |
| 6,615,570 | B2 | * | 9/2003 | Beck et al. ................. 56/10.2 E |
| 7,011,269 | B1 | * | 3/2006 | Chouinard et al. ........... 242/557 |
| 7,787,989 | B2 | * | 8/2010 | Colens .......................... 700/245 |
| 7,806,359 | B1 | * | 10/2010 | Lillig ............................ 242/557 |
| 7,844,378 | B2 | * | 11/2010 | Lange ............................. 701/50 |
| 7,852,463 | B2 | * | 12/2010 | Hartman et al. ............. 356/5.01 |
| 2001/0042646 | A1 | * | 11/2001 | van den Berg ................ 180/6.2 |

(Continued)

FOREIGN PATENT DOCUMENTS

EP   0 943 235 A2   9/1999

(Continued)

*Primary Examiner* — Jonathan M Dager
(74) *Attorney, Agent, or Firm* — Coraline J. Haitjema; David P. Owen; Hoyng Monegier LLP (57) ABSTRACT A system for demarcating an area comprises a first vehicle, an attachment point, a demarcating element, a motor and a vehicle control unit. The demarcating element extends from the first vehicle to the attachment point. The system furthermore comprises a camera, which camera is operatively connected to the vehicle control unit.

14 Claims, 4 Drawing Sheets

| U.S. PATENT DOCUMENTS | | | |
|---|---|---|---|
| 2002/0011595 A1* | 1/2002 | Van den Berg | 256/40 |
| 2005/0217600 A1* | 10/2005 | Berg | 119/510 |
| 2005/0279982 A1* | 12/2005 | van den Berg | 256/10 |
| 2007/0018602 A1* | 1/2007 | Vlaar et al. | 318/587 |
| 2009/0223454 A1* | 9/2009 | Van Den Berg et al. | 119/14.04 |
| 2012/0226407 A1* | 9/2012 | Noordam | 701/25 |

| FOREIGN PATENT DOCUMENTS | | |
|---|---|---|
| WO | 00/70935 A | 11/2000 |
| WO | 00/70939 A | 11/2000 |
| WO | 00/70941 A | 11/2000 |
| WO | 01/28317 A | 4/2001 |

\* cited by examiner

SYSTEM FOR DEMARCATING AN AREA

This application is a continuation of international application no. PCT/NL2007/000234, filed on Sep. 19, 2007, and claims priority from Netherlands application no. 1032662 filed on Oct. 11, 2006. The contents of both applications are hereby incorporated by reference in their entirety.

BACKGROUND OF THE INVENTION

1. Field of the Invention

The invention relates to a system for demarcating an area, in particular for limiting the freedom of movement of free-roaming animals, according to the preamble of claim 1.

2. Description of the Related Art

European patent 1,139,725 discloses a system for demarcating an area on which cows graze. The system comprises two or more self-propelled vehicles between which an electrified wire runs. Each of the vehicles is provided with a GPS receiver. By means of the GPS receivers, the vehicles are able to determine the distance between them. The vehicles are remotely controlled by a computer in such a manner that they move the electrified wire together. In this way, it is possible in each case to make a new part of the area available for the cows. The computer can in this case be programmed in such a manner that the vehicles move according to a predetermined pattern at predetermined points in time. In this case, the computer has to be provided with information regarding the shape and dimensions of the area, including the presence of ditches, fences and any other obstacles.

It is a drawback of the abovementioned system that it is not sufficiently reliable. Thus, the electrified wire, or one of the vehicles may become stuck during the displacement of the vehicles according to the predetermined pattern.

BRIEF SUMMARY OF THE INVENTION

It is an object of the invention to eliminate the abovementioned drawbacks at least partially or at least to offer an alternative. In particular, it is an object of the invention to provide a more reliable system for demarcating an area.

This object is achieved according to the invention by means of a system for demarcating an area, in particular for limiting the freedom of movement of free-roaming animals. The system comprises a first vehicle, a motor, a vehicle control unit, an attachment point and a demarcating element. The demarcating element extends from the first vehicle to the attachment point. The system furthermore comprises a camera, which camera is operatively connected to the vehicle control unit for transmitting a signal from the camera to the vehicle control unit.

The camera provides the vehicle control unit with up-to-date information about the area, the boundaries of this area, such as fences and ditches, as well as about animals and any other obstacles in the area. Based on this information, the vehicle control unit can control the vehicle in such a manner that any obstacles, fences and ditches are avoided, even if they should change position in the course of time. In this manner, the invention increases the reliability.

The camera may be designed to create a three-dimensional image. Based on the three-dimensional image, the vehicle control unit is able to determine distances to objects which have to be avoided or, on the contrary, have to be followed. This improves the quality of the navigation, as a result of which the first vehicle is able to move more quickly and/or more reliably.

The camera may comprise a source of radiation for emitting electromagnetic radiation, in particular light, a matrix having several rows and several columns of receivers for receiving electromagnetic radiation reflected by an object, such as an animal, a lens for displaying the reflected electromagnetic radiation on the receivers, and a sensor control unit operatively connected to the source of radiation in order to modulate the electromagnetic radiation, for determining a phase difference for each of the receivers between the emitted and the reflected electromagnetic radiation.

Such a camera produces a reliable three-dimensional image in the form of distance or depth information for several points on a visible object to the camera. Such a camera is relatively inexpensive and generates the three-dimensional image in a short amount of time.

The following is an explanation of the operation of a possible camera. The source of radiation emits electromagnetic radiation. Preferably light is used for this purpose, more preferably infrared radiation, more preferably near-infrared (NIR) radiation. The fact is that, for this purpose, suitable LEDs can be used which are very easy to drive by means of an electrically controlled supply current, and which are, in addition, very compact and efficient and have a long service life. However, it is also possible to use other sources of radiation. The advantage of (near-)infrared radiation is that the radiation does not irritate (dairy) animals.

The radiation is modulated, for example amplitude-modulated, in accordance with a modulation frequency which is, of course, different from and is much lower than the frequency of the electromagnetic radiation itself. The, for example, infrared light is in this case a carrier for the modulation signal.

By means of the emitted radiation, the distance is determined by measuring a phase shift of the modulation signal, by comparing the phase of the reflected radiation with the phase of the reference radiation. For the latter, the emitted radiation is preferably (almost) directly passed on to the receiver. The distance can easily be determined from the measured phase difference by applying: distance=½×wavelength×(phase difference/$2\pi$), wherein the wavelength is that of the modulation signal. Note that the above relation does not make any allowance yet for unique determination of the distance which results from the fact that a phase difference, due to the periodicity, may be associated with a distance A, but also with A+n×(wavelength/2). For this reason, it may be sensible to choose the wavelength of the amplitude modulation in such a manner that the distances which occur in practice are indeed uniquely determined.

Preferably, a wavelength of the modulation, for example amplitude modulation, of the emitted radiation is between 1 mm and 5 m. Hereby, distances can be uniquely determined up to a maximum distance of between 0.5 mm to 2.5 m, which is associated with a modulation frequency of between 300 MHz to 60 kHz, which can be readily achieved in electric circuits for driving LEDs. It should be noted that it is also possible to choose smaller or larger wavelengths, if desired.

In one embodiment, the vehicle control unit is designed to navigate the first vehicle along a boundary of the area, such as a ditch or a fence, on the basis of an image from the camera. As a result thereof, it is no longer necessary to navigate on the basis of GPS information. The drawback of GPS navigation is that it is insufficiently accurate, which may lead to the distance between the vehicle and the ditch becoming too great or too small. If the distance is too great, animals will be able to move between the vehicle and the ditch, as a result of which they will end up in that part of the area which should have been demarcated by the system. If the distance is too small, a vehicle may end up on the slope of the ditch, or even in the ditch itself.

In an advantageous embodiment, the vehicle control unit is designed to extract information about the availability of feed in the area from at least one image from the camera and, partly on the basis of this information, to determine a movement speed and/or movement frequency of the first vehicle. The term movement speed may in this context be understood to mean the direction as well as the magnitude of the speed. As a result thereof, it is no longer necessary to use an averaged, estimated or user-determined amount of available feed. Thus, the relevant information is obtained in a more accurate way or with less effort.

In one embodiment, the vehicle control unit is designed to collect information about the presence of animals in the area from at least one image from the camera and to determine a movement speed and/or movement frequency of the first vehicle, partly on the basis of this information. The presence of an animal in the vicinity of the first vehicle can directly influence the navigation, for example because the respective animal is situated in the intended direction of movement. Also, the movement speed and/or movement frequency can partly be determined by means of the number of observed animals in order thus to match the size of the area to be made accessible to this number. Thus, a user does not need to adjust the settings of the vehicle control unit by hand if he takes dairy animals to the area or removes them from the area.

In an advantageous embodiment, the vehicle control unit is designed to collect information about a present contour of the demarcating element from at least one image from the camera and to determine, partly on the basis of this information, a movement speed of the first vehicle and/or to drive tensioning means for tensioning the demarcating element. By comparing the present contour of the demarcating element with predetermined contours, the vehicle control unit is, for example, able to determine that the demarcating element is sagging too much and drive the tensioning means accordingly. The demarcating element may also have an undesired contour in a horizontal plane, for example because it has become stuck on an object. The vehicle control unit may, in particular, try to remedy this by driving the tensioning means and/or the motor of the first vehicle. If this is to no avail, the vehicle control unit may, more particularly, emit an alarm signal.

In one embodiment, the camera is physically connected to the first vehicle. As a result thereof, the first vehicle carries the camera along and the vehicle control unit obtains information from the position of the first vehicle.

In an advantageous embodiment, the attachment point is provided on a second vehicle. Using a second vehicle makes the system more flexible and obliterates the need to move the attachment point manually.

The invention also relates to a method for demarcating an area. The method includes providing a first vehicle, a motor for driving the first vehicle, a vehicle control unit for controlling the first vehicle, an attachment point, a demarcating element, and a camera operatively connected to the vehicle control unit. The method further includes steps of extending the demarcating element from the first vehicle to the attachment point, and transmitting a signal from the camera to the vehicle control unit.

The method may further comprise producing a three-dimensional image using the camera. The camera may comprise a source of radiation for emitting electromagnetic radiation, a matrix having a plurality of rows and columns of receivers, a lens, and a sensor control unit operatively connected to the source of radiation, and the method may further comprise emitting electromagnetic radiation from the source of radiation, receiving electromagnetic radiation reflected by an object using the receivers, displaying the reflected electromagnetic radiation using the lens, modulating the electromagnetic radiation using the sensor control unit and determining a phase difference between the emitted and the reflected electromagnetic radiation for each of the receivers.

BRIEF DESCRIPTION OF THE DRAWINGS

The invention will now be explained in more detail below with reference to the attached figures, which show a non-limiting exemplary embodiment, in which.

DESCRIPTION OF ILLUSTRATIVE EMBODIMENTS

Figure 1:
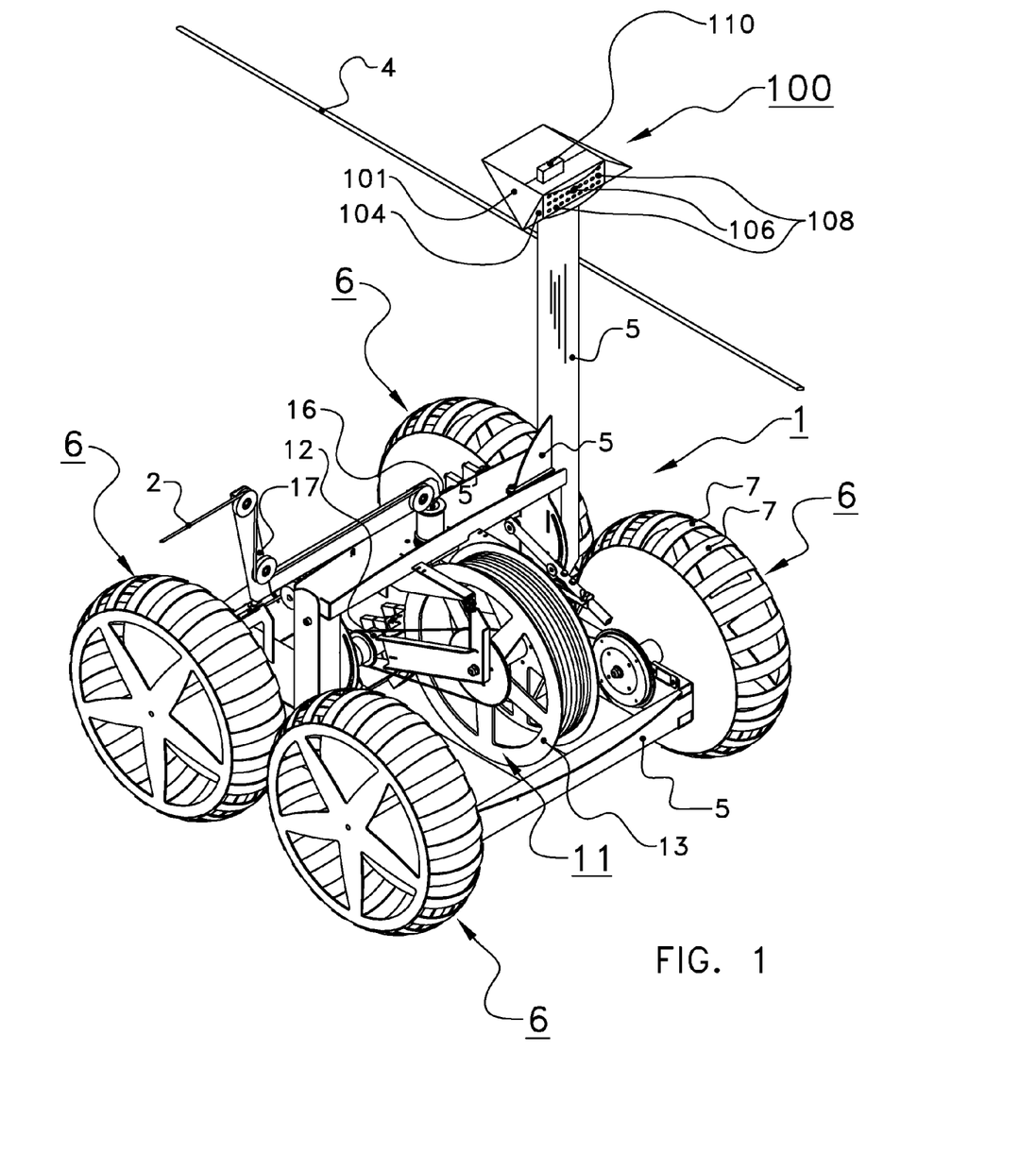
FIG. 1 shows a first unmanned vehicle according to the invention, next to a fence.
Figure 3:
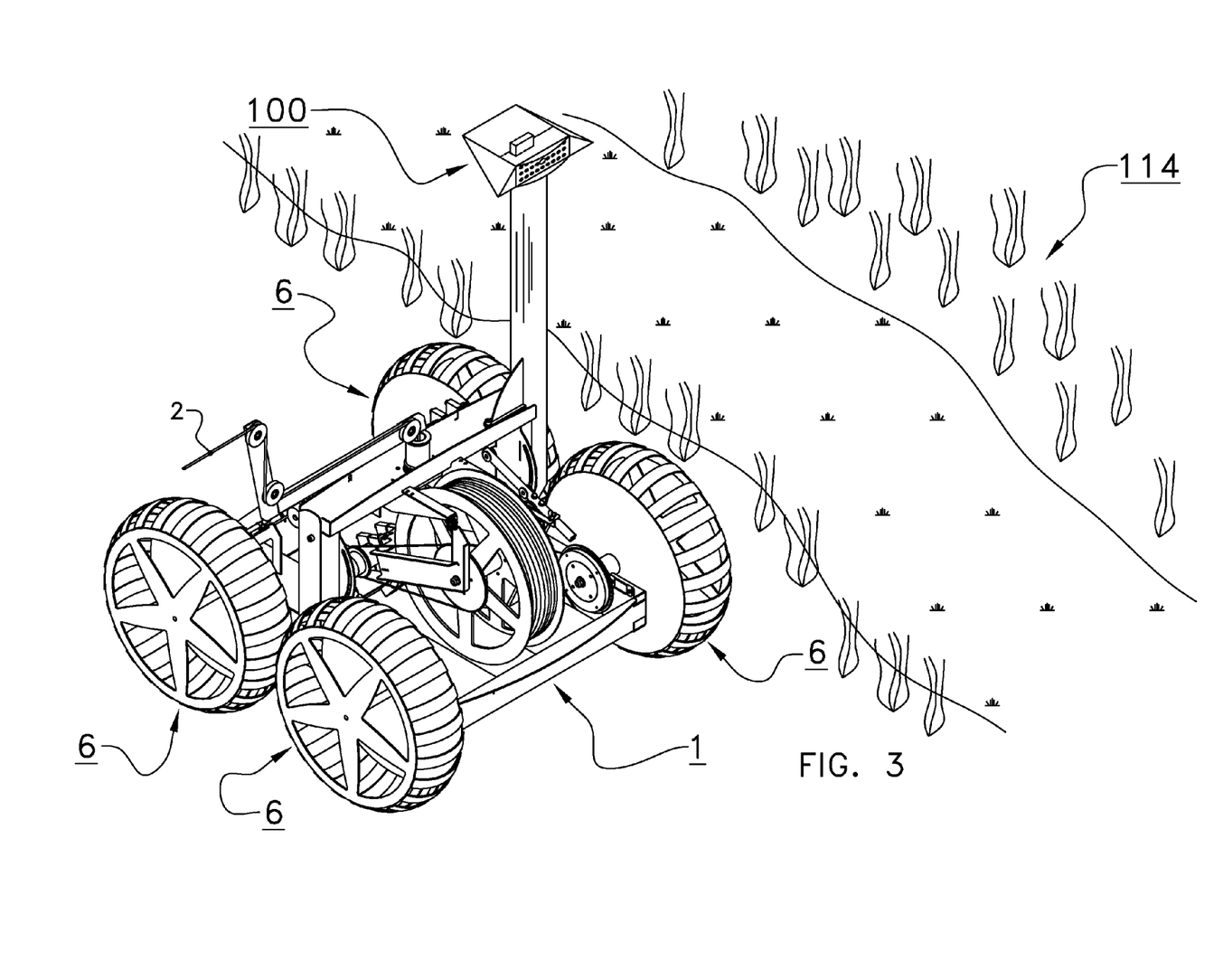
FIG. 3 shows the first unmanned vehicle from FIG. 1 next to a ditch.

The following is a description of certain embodiments of the invention, given by way of example only and with reference to the drawings. FIGS. 1 and 3 show a first unmanned vehicle 1 which is provided with a demarcating element 2. The first unmanned vehicle 1 is inside an area, such as a pasture, which is already partly demarcated by means of a fence 4 (FIG. 1). In the present exemplary embodiment, both the demarcating element 2 and the fence 4 are designed in the form of a wire which can be electrified.

The first vehicle 1 in this exemplary embodiment comprises a frame 5 having four cage wheels 6. The cage wheels 6 have a running surface which is formed by convex strips 7 which are spaced apart from one another. The left-hand and right-hand pairs of cage wheels 6 each comprise a drive belt 8 which drives one pair of cage wheels 6 at a time by means of an electric stepping motor 9, one of which is arranged on the frame 5 for each separate pair of cage wheels 6 (see FIG. 2). Driving the electric stepping motors 9 simultaneously or independently of one another makes it possible to control the unmanned first vehicle 1.

Figure 2:
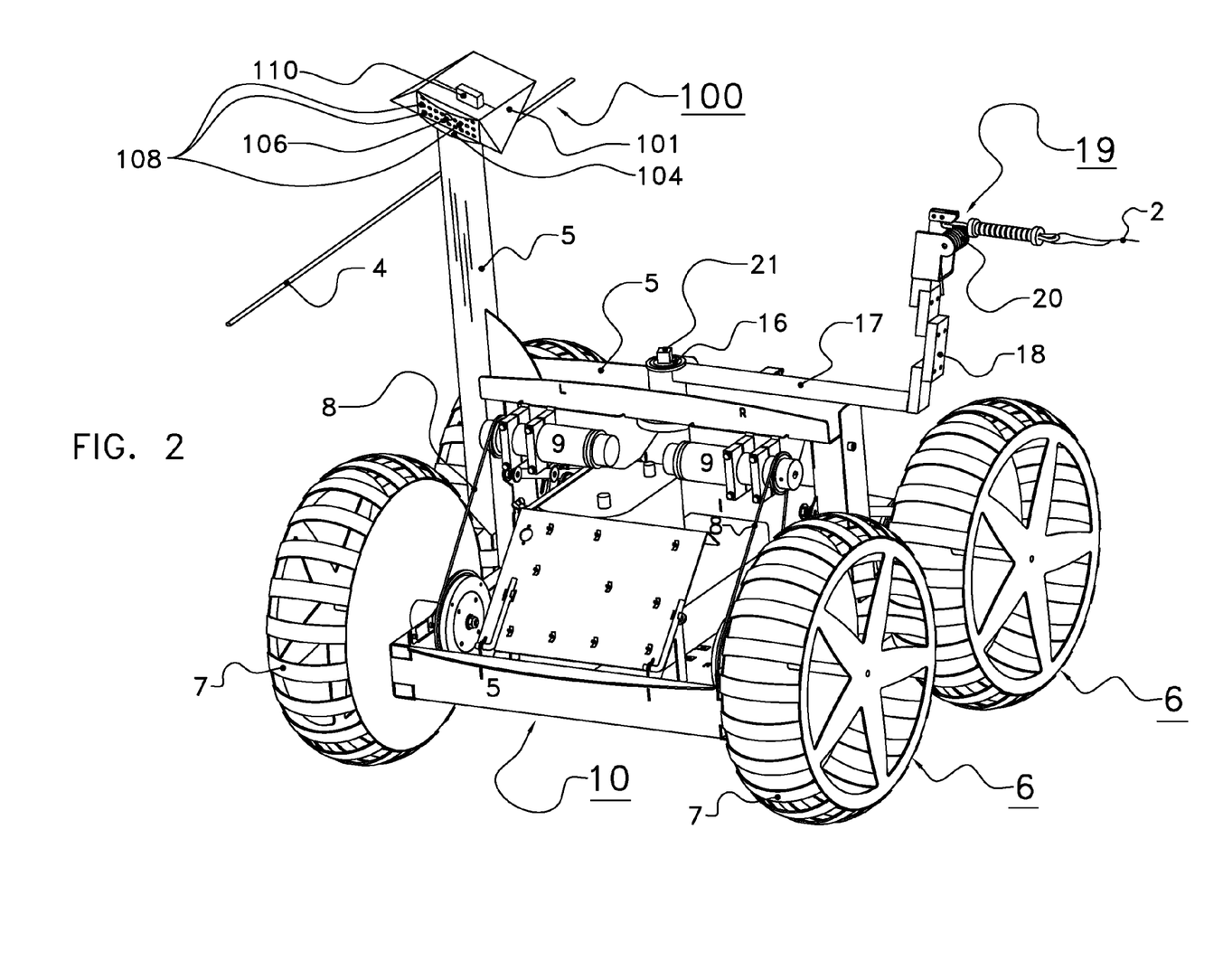
FIG. 2 shows a second unmanned vehicle according to the invention.

In order to be able to tension the demarcating element 2 between a first vehicle 1 and a second unmanned vehicle 10, as illustrated in FIG. 2, the first vehicle 1 in this exemplary embodiment is provided with a tensioning device 11 for tensioning the demarcating element 2 between both vehicles. The tensioning device 11 comprises winding device 13 which can be driven by an electric motor 12 for winding up and unwinding the demarcating element 2. As the first vehicle 1 and the second vehicle 10 are essentially identical except for the tensioning device 11, identical parts are denoted by the same reference numerals.

The winding device 13 is attached to the frame 5 in a first suspension point by means of a load cell (not shown) and to a further part of the frame 5 in a second suspension point by means of a leaf spring (not shown). A guide piece 17 which can be rotated about a vertical shaft 16 is also arranged on the frame 5, via which guide piece 17 the demarcating element 2 is guided to the winding device 13.

As is illustrated in FIG. 2, the guide piece 17 is provided with a load cell 18 for determining the tensioning force of the demarcating element 2 on the second vehicle 10. The end of the guide piece 17 is furthermore provided with a break-away protection 19 to which the guide element 2 can be attached. In the present invention, the break-away protection 19 is designed as a spring break-away protection which comprises a helical bending spring 20 having a round cross section. If the tensioning force with which the demarcating element 2 is held between the two vehicles 1, 10 exceeds a certain maximum value, the eyelet fastening is catapulted from the spring break-away protection. It will be clear that the eyelet fastening can be inserted back into the spring break-away protection in a simple manner by an operator without it being damaged.

The guide piece 17 furthermore comprises an angle gauge 21 by means of which the angular rotation of the guide piece 17 on the vertical shaft 16 can be determined. If the angular rotation exceeds a predetermined maximum angle, the vehicle is not driven further in order to prevent the tensioning force of the demarcating element becoming excessive. This tensioning force and the fact that driving of the vehicle stops when this tensioning force is exceeded can be measured in the first vehicle 1 by means of the load cell of the tensioning device 11.

On the frame 5 of, in this exemplary embodiment, both the first 1 and the second vehicle 10, a camera is provided, in this case a combined 2D/3D camera 100. The 2D/3D camera 100 comprises a plastic housing 101 which is movably connected to the frame 5 via a ball joint (not shown). By means of the ball joint, the 2D/3D camera 100 can rotate about a vertical axis and tilt about a horizontal axis using actuators (not shown), for example actuating motors.

Alternatively, the 2D/3D camera 100 may be fixedly connected to the frame 5, connected by means of a joint which essentially allows rotation about a vertical axis, or connected by a joint without actuators.

The housing 101 comprises a front side 104. In the front side 104, a lens 106 and several sources of radiation, in this exemplary embodiment light sources 108 in the form of infrared light-emitting diodes (IR LEDs), are accommodated. In a variant, the lens 106 is provided on the inside of the front side 104, the front side 104 being made from a material which allows infrared light through. In this manner, the lens 106 is protected from external influences and the flat plastic front side 104 can be cleaned more easily than the front side 104 having a protruding lens 106.

The housing 101 further accommodates a position-sensitive sensor, such as a CMOS image sensor 110. On a side facing the lens 106, the CMOS image sensor 110 comprises a matrix with several rows and columns of receivers, in the form of light-sensitive photodiodes. In this exemplary embodiment, this is a matrix of 64×64 photodiodes, but resolutions of 176×144, 640×480, and other, smaller or greater, matrices are likewise possible. The CMOS image sensor 110 comprises integrated sensor control unit which drives the IR LEDs 108 and which process the infrared light which impinges on each of the photodiodes to form a digital signal and pass this onto a central processing unit or computer via a wireless (not shown) or wire connection (also see below).

The sensor control unit of the 2D/3D camera 100 determines the distance of an object relative to each of the photodiodes by means of measuring a phase difference between the light which is emitted by the IR LEDs 108 from the 2D/3D camera 100 to an object and the light which returns, after having been reflected, to the 2D/3D camera 100, i.e. to the CMOS image sensor 110 thereof.

In an advantageous embodiment, the IR LEDs 108 emit an amplitude-modulated wave light signal. The amplitude modulation itself has a repetition frequency. Following reflection, this light signal is displayed on the CMOS image sensor 110 by the lens 106. By determining the phase difference of the received modulated light signal compared to the emitted modulated light signal, it is possible to calculate the distance between sensor and object by means of the wavelength of the modulated signal. This is carried out simultaneously for each of the photodiodes on the CMOS image sensor 110. Thus, a spatial or three-dimensional image of the observed object is produced.

It should be noted that the distance has not yet been uniquely determined in this manner. After all, an object may be at a distance from the sensor which is a multiple of wavelengths of the light signal used. In practice, this can be solved, for example, by varying the frequency of the amplitude modulation as well.

In a particular embodiment, short light pulses may be emitted by the IR LEDs 108, provided each light pulse comprises at least one whole, preferably two or more, waves of the modulated signal.

Depending on the selected frequency of the amplitude modulation, the 2D/3D camera 100 can take several, for example fifty, images per second. Each image is in this case to be regarded as a reliable representation of the observed object, such as the fence 4 (FIG. 1), a ditch 114 (FIG. 3), grass, or an animal, such as a cow.

In addition to a spatial image, the CMOS image sensor 110 in this exemplary embodiment can also generate a 2-dimensional image, in which differences in color and reflection of the observed object are converted into different shades of gray.

Figure 4:
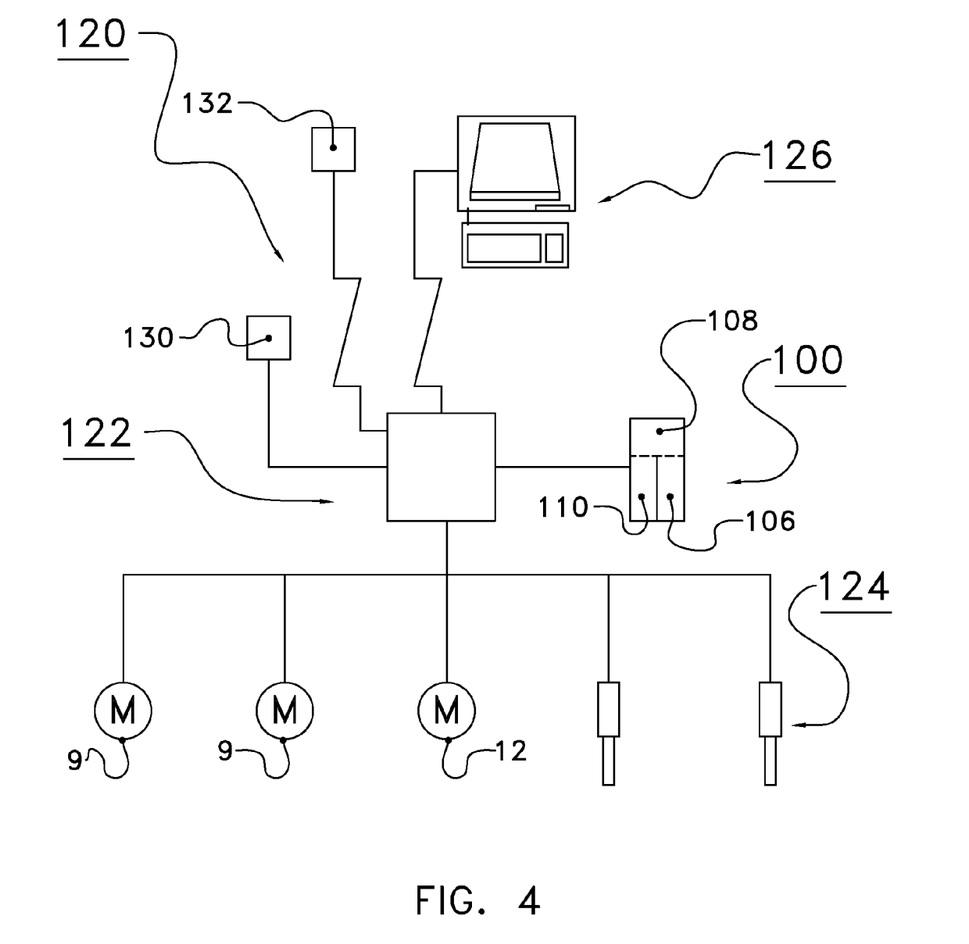
FIG. 4 shows a control circuit for the first and/or second unmanned vehicle.

FIG. 4 diagrammatically shows a vehicle control unit or vehicle control unit means, in this case in the form of a control system 120. The control system 120 comprises a central processing unit 122 for driving one or more actuators 124, and a user station in the form of a personal computer (PC) 126. The actuators 124 comprise the motors 9 and 12 and, optionally, the actuating motors (not shown) for directing the 2D/3D camera 100 itself. The 2D/3D camera is operatively connected to the central processing unit 122, in this exemplary embodiment via a wire connection.

In this exemplary embodiment, the central processing unit 122 is provided in a position (not shown) on the frame 5 of the first vehicle 1, while a separate central processing unit (not shown) is provided on the second vehicle 10. The central processing unit 122 is designed to perform various tasks, which are to be described in more detail below. To this end, the central processing unit 122 in this exemplary embodiment has a working memory and is programmed using control software and interprets the images of the 2D/3D camera 100 on the basis of algorithms, and/or fuzzy logic control. Based on this interpretation, the central processing unit 122 drives one or more actuators 124, as will be described in more detail below.

The central processing units 122 of the first unmanned vehicle 1, the second unmanned vehicle 10 and of any more unmanned vehicles (not shown), are connected to the PC 126 via a fixed, or preferably wireless, connection. The control software of the central processing unit 122 can be loaded and/or modified via the PC 126. In addition, a monitor of the PC 126 can display an optionally edited image from the 2D/3D camera 100. This screen can also display any warnings, if the central processing unit 122 determines, based on the image from the 2D/3D camera 100, that a failure or other undesirable event is occurring.

Finally, the PC 126 may be provided with, or may be connected to, further peripheral equipment, such as a storage medium (not shown), on which images from the camera and/or edited information can be stored. The PC 126 may be the same PC which is also used to perform other tasks of, for example, a diary farm, if desired incorporating the function of driving the unmanned vehicles 1 and 10. The PC 126 may also form part of a network of computers which together, for example, carry out various processes on the dairy farm, such as farm management and controlling and monitoring milking robots.

The central processing unit 122 of the first unmanned vehicle 1, and optionally that of the second unmanned vehicle 10 and any more unmanned vehicles (not shown), are connected, via a fixed or wireless connection, to one or more observation devices which are designed to observe an entity near the movable demarcating element. As an alternative or in addition thereto, such observation devices can also be connected to the PC 126. The observation devices in this exemplary embodiment are the above-described 2D/3D camera 100, a climate sensor 130 and a milk sensor 132.

The control system 120, and in this exemplary embodiment the central processing unit 122 in particular, are designed to receive and process a signal from the observation devices 100, 130, 132. The climate sensor 130 is designed to determine the temperature, air pressure, air humidity, wind speed and/or amount of precipitation in the surroundings of the first vehicle 1 and thus of the demarcating element 2. The milk sensor 132 is designed to determine the amount and/or the composition of milk which is extracted from a dairy animal (not shown) in a milking device (not shown).

In use, the 2D/3D camera 100 will form an image of the area which is to be demarcated and/or has been demarcated, in this example a part of the pasture which has been grazed on and a part of the pasture which has not yet been grazed on, respectively. In addition, the 2D/3D camera 100 can form an image of the boundaries of these areas which, for example, may be in the form of the fence 4 (FIG. 1), or the ditch 114 (FIG. 3). In order to produce a larger or differently oriented image, the control system 120 can turn the 2D/3D camera 100 by one of the actuating motors.

Based on the image of the part of the pasture which has already been grazed on, the control system 120 is able to determine to what extent the amount of available grass has already been grazed off. To this end, use is advantageously made of the depth information of the 2D/3D camera 100. On the basis thereof, the control system 120 can decide whether the first 1 and/or second 10 vehicle should be moved, and also by how much and in which direction they should be moved.

Based on the image of the 2D/3D camera 100 of the first vehicle 1, the control system 120 determines the distance and orientation of the fence 4 (FIG. 1), or the ditch 114 (FIG. 3) with respect to the first vehicle 1. On the basis thereof, the motors 9 are driven in such a manner that the first vehicle 1 drives along the fence or ditch at a predetermined distance therefrom. In this case, it is advantageous that the control system 120 starts from the actual course of the fence or ditch. If, for example, the course of the fence were to be modified, then, according to the prior art, this could result in the first vehicle 1 not following the fence anymore or in fact colliding with the latter.

Furthermore, the system according to the invention is more flexible and user-friendly than that according to the prior art. If a user moves a fence, digs or fills a ditch, or modifies the area in any other way, he does not have to incorporate these changes in the predetermined pattern for remotely controlling the unmanned vehicles. Thanks to the 2D/3D camera 100, the system will automatically detect the relevant changes.

In addition, from the images from the 2D/3D camera 100, the control system 120 can deduce whether cows are present and at what distance to the first unmanned vehicle 1 these are located. Based on this information, collisions with cows can be prevented. The control system 120 can also deduce from the images how many cows there are. To this end, it is advantageous to use several images over a period of time, or images from several 2D/3D cameras 100. After all, cows may, viewed from the 2D/3D camera 100, be located behind other cows, as a result of which not all cows can be observed simultaneously by one 2D/3D camera 100.

Furthermore, the control system 120 is able to deduce from the images how the cows are distributed over the area. If a substantial number of the cows is distributed over substantially the entire area which has been made available, this means that sufficient grass is available. If a substantial number of the cows are near the demarcating element 2, this means that there is insufficient grass available in the area which has been made available. This is an indication that an additional strip of pasture has to be made available and thus that the unmanned vehicles 1, 10 have to be moved.

The control system can also estimate from the images the remaining amount of grass in that part of the pasture which has been made available to the cows and the amount of grass which is available in the part which is still closed off. The control system 120 can then adjust the amount of grass which is made available on the basis of the number of cows which are present, the remaining amount of grass and/or the available amount of grass in the part which is still closed off.

Based on the information from the climate sensor 130, the control system 120 can, if desired, produce an estimate of the speed at which the grass is expected to grow. This estimate may, in part, determine the point in time and/or the amount by which the demarcating element 2 is moved next. In addition, it is also possible to determine the amount of grass the animals present in the demarcated area require on the basis of the signals from the climate sensor 130. Thus, this need will be less great in extremely hot weather than with more moderate temperatures.

The data from the milk sensor 132 can be used to determine the amount and/or composition of the milk produced by every individual dairy animal which is present in the demarcated area and/or for the total number of these dairy animals. If the amount of milk produced is small for a group of this size and/or if the milk is of low quality, this forms an indication that too little grass was eaten and may be a factor indicating to the control system 120 to make a larger new area available than on the previous occasion using the vehicles 1 and 10 and the demarcating element 2. It is also possible to bring the point in time at which a part of the area is made available forward.

While the first vehicle 1 is driving, the second vehicle 10 may remain stationary or drive at the same time. In both cases, the length of the wire 2 can be adjusted to a varying distance between the two vehicles 1, 10 by means of the motor 12 of the tensioning device 11. It is also possible for one of the two, or for both 2D/3D cameras 100 to observe the wire 2 in order to determine whether the latter is sagging too much or is, on the contrary, very taut. As a result thereof, in a variant which is not shown, the angle gauge 21 and/or the load cell can advantageously be omitted. The driving of the second vehicle 10 is preferably driven based on images of its own 2D/3D camera 100, it being possible for the relevant control systems 120 to match the displacements of the first 1 and second 10 vehicles with one another by communicating with one another directly or via the PC 126.

Various variants are possible without departing from the scope of the invention. Thus, it is possible to provide only the first vehicle with the camera, the second vehicle for example being driven on the basis of the images from and/or the displacement of the first vehicle. It is also possible to use another demarcating element, such as non-electrified wire, barbed wire or mesh, instead of electrified wire.

The vehicle control unit or the control system is able to control the vehicles completely autonomously. It is also possible for part of the above-described tasks of the vehicle control unit, such as determining the movement speed, duration and frequency of the vehicles, to be carried out by means of a computer which is operatively connected to the vehicle control unit. Instead of one central processing unit for each unmanned vehicle, it is also possible to provide a single central processing unit which controls several unmanned vehicles.

The central processing unit may comprise a programmable unit, but may, for example, also be composed of non-programmable logic circuits and/or of memories which can only be programmed to a limited extent, such as an (E)EPROM. The vehicle control unit or control system is designed to carry out the above-described tasks. A customary method of producing a control unit is by programming it by means of software. Alternatively, or in combination with specific software, the control unit may also be completely or partly composed of electronic components comprising previously provided circuits for carrying out (part of) the above-described tasks. In other words, the control unit can be equipped to carry out its tasks by means of software and/or specific hardware.

It is also possible to use a 2D camera, a pair of 2D cameras, or a 3D camera without 2D functionality instead of a combined 2D/3D camera. Instead of a 2D/3D camera on one or more vehicles, a 2D/3D camera can also be provided separately. It is also possible to use a passive infrared camera, for example for observing dairy animals, instead of a 2D/3D camera.

The 2D/3D camera can be provided on an observation vehicle which is not simultaneously being used to attach a demarcating element on. Such an observation vehicle may be an earth-bound vehicle, or an airborne vessel. The 2D/3D camera may also be provided at a fixed point in or near the area to be demarcated.

Instead of using two vehicles, it is also possible to use one vehicle and a fixed point in the area, for example a post of the fence going around the pasture. When the one vehicle is driving, the distance to the fixed point may change, and the tensioning device will adjust the length of the demarcating elements accordingly. The fixed point may be displaced periodically by, for example, manually attaching the relevant end of the demarcating elements to another post.

The motor driving the unmanned vehicle can be an electric motor or a combustion engine. The motor does not have to be inside the vehicle, but may also be, for example, at a fixed point in or near the area and be connected to the vehicle via drive element, such as a cable.

Instead of being directly connected to the central processing unit, the observation devices can also be connected to the PC. Also, the control system may be connected to other observation devices than the ones shown, it even being possible for these observation devices themselves to be at a distance to the respective area to be demarcated. Such observation devices may be situated, for example, on board an airplane or satellite, or may be climate sensors at a climatological institute. Such a climatological institute could also preprocess climate data to produce, for example, a signal which is representative of the expected growth rate of the grass.

It is also possible for at least one dairy animal, some of the dairy animals or all of the dairy animals to be provided with a GPS receiver and a transmitter for transmitting the current situation of the dairy animals in question. Furthermore, the system may be provided with a feed dispensing sensor for observing the dispensing of solid and/or liquid feed to an animal, also including water. Thus, the control system is able to adapt the amount of grass to be made available to the amount of other feed which has been dispensed.

The dairy animals may also be provided with a feeding sensor which, in combination with the position information, also makes it possible to determine whether or not the dairy animal in question is feeding or not. The information of the GPS receiver and/or of the feeding sensor may, together with or instead of, the information from the 2D/3D camera be processed in the control system in order to determine whether and where the cows are feeding, which information can be used in order to determine whether, when, and by what distance the demarcating element has to be moved by one or more vehicles.

Thus, the invention has been described by reference to certain embodiments discussed above. It will be recognized that these embodiments are susceptible to various modifications and alternative forms well known to those of skill in the art. Accordingly, although specific embodiments have been described, these are examples only and are not limiting upon the scope of the invention. The person skilled in the art will be able to apply various modifications and adaptations within the scope of the invention, the scope of protection for the invention being determined by the accompanying claims.

What is claimed is:

1. A system for demarcating an area, the system comprising:
   a first vehicle;
   a motor for driving the first vehicle;
   a vehicle control unit for controlling the first vehicle;
   an attachment point; and
   a demarcating element;
   wherein the demarcating element extends from the first vehicle to the attachment point, and
   wherein the system furthermore comprises a camera operatively connected to the vehicle control unit for transmitting a signal from the camera to the vehicle control unit;
   wherein the camera is designed for producing a three-dimensional image.

2. The system as claimed in claim 1, wherein the camera comprises:
   a source of radiation for emitting electromagnetic radiation;
   a matrix having a plurality of rows and columns of receivers for receiving electromagnetic radiation reflected by an object;
   a lens for displaying the reflected electromagnetic radiation; and
   a sensor control unit operatively connected to the source of radiation for modulating the electromagnetic radiation, for determining a phase difference between the emitted and the reflected electromagnetic radiation for each of the receivers.

3. The system as claimed in claim 1, wherein the vehicle control unit is for navigating the first vehicle along a boundary of the area on the basis of the image from the camera.

4. The system as claimed claim 1, wherein the vehicle control unit is for extracting information about the availability of feed in the area from at least one image from the camera and determining a movement speed and/or movement frequency of the first vehicle based at least in part on the information.

5. The system as claimed in claim 1, wherein the vehicle control unit is for collecting information about the presence of animals in the area from at least one image from the camera and determining a movement speed and/or movement frequency of the first vehicle based at least in part on the information.

6. The system as claimed in claim 1, wherein the vehicle control unit is for collecting information about a present contour of the demarcating element from at least one image from the camera and determining, based at least in part on the information, a movement speed of the first vehicle and/or to drive tensioning means for tensioning the demarcating element.

7. The system as claimed in claim 1, wherein the camera is physically connected to the first vehicle.

8. The system as claimed in claim 1, wherein the attachment point is provided on a second vehicle.

9. A method for demarcating an area, the method comprising:
   providing a first vehicle, a motor for driving the first vehicle, a vehicle control unit for controlling the first vehicle, an attachment point, a demarcating element, and a camera operatively connected to the vehicle control unit;
   extending the demarcating element from the first vehicle to the attachment point;
   transmitting a signal from the camera to the vehicle control unit; and
   producing a three-dimensional image using the camera.

10. The method as claimed in claim 9, wherein the camera comprises a source of radiation for emitting electromagnetic radiation, a matrix having a plurality of rows and columns of receivers, a lens, and a sensor control unit operatively connected to the source of radiation, and wherein the method further comprises:
   emitting electromagnetic radiation from the source of radiation;
   receiving electromagnetic radiation reflected by an object using the receivers;
   displaying the reflected electromagnetic radiation using the lens;
   modulating the electromagnetic radiation using the sensor control unit; and
   determining a phase difference between the emitted and the reflected electromagnetic radiation for each of the receivers.

11. The method as claimed in claim 9, further comprising navigating the first vehicle along a boundary of the area on the basis of the image from the camera.

12. The method as claimed in claim 9, further comprising extracting information about the availability of feed in the area from at least one image from the camera and determining a movement speed and/or movement frequency of the first vehicle based at least in part on the information.

13. The method as claimed in claim 9, further comprising collecting information about the presence of animals in the area from at least one image from the camera and determining a movement speed and/or movement frequency of the first vehicle based at least in part on the information.

14. The method as claimed in claim 9, further comprising collecting information about a present contour of the demarcating element from at least one image from the camera and determining, based at least in part on the information, a movement speed of the first vehicle and/or to drive tensioning means for tensioning the demarcating element.

* * * * *